Patented Apr. 5, 1927.

1,623,598

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

CARBON CATALYST AND PROCESS OF MAKING IT.

No Drawing.    Application filed November 27, 1920. Serial No. 426,864.

This invention relates to a new form of carbon characterized by possessing chemical activity in a high degree, and to processes in which this carbon acts as a catalyst. This highly reactive carbon may be derived from the alkali-soluble constituents of wood or other vegetable fibers such as cotton, esparto, straw, and so forth, by thermal decomposition.

The organic constituents of wood which are dissolved by the alkali used in the "soda process" include certain forms of cellulose which are soluble in sodium hydroxide solution, and various resins. The proportion of cellulose soluble in sodium hydroxide solution, and of resins, varies considerably in different kinds of wood. The sodium hydroxide-soluble cellulose is usually present in substantial proportions; the carbon obtained from wood in the above-described manner may therefore be said to consist essentially of alkali-soluble-cellulose carbon and alkali-soluble-wood-resin carbon. The alkali-soluble form (i. e. the beta and gamma forms) of cellulose, also exists to some extent in cellulosic substances such as cotton, esparto, straw, etc.; the carbon obtained from the alkali-soluble constituents of wood and other crude cellulose of this kind may be referred to generically as alkali-soluble-cellulose carbon.

In my pending application Serial No. 312,610, filed July 22, 1919, I described the chemical activity of carbon from the incineration of black liquor obtained in the purification of cellulose from wood or other fibers used in the paper pulp industry, and also described the method of obtaining the black liquor by the cooking of the fibers in caustic soda solution. I described the usual method of incinerating the black liquor according to which the black liquor, after evaporation to about 35° Bé., is fed into incinerators usually of the rotary type, where at the expense of a part of the contained carbon, the water is evaporated and a black ash results containing substantially 85–90% sodium carbonate and 15–10% carbon,—the mass in the incinerator becoming heated to a red heat during the operation.

I have now discovered that if instead of incinerating the black liquor by this usual method wherein the residue becomes heated to a red heat, it be evaporated at a comparatively low temperature (below a red heat, that is below 550° C. and preferably at about 200–350° C. or thereabouts), there results the usual recovery of soda ash to be returned to the paper pulp process, with an increased yield of carbon. The final residue in this case contains sodium compounds equivalent to 60–65% soda ash and 40–35% carbon, the carbon as obtained from this low temperature decomposition of the alkali soluble compounds present in the black liquor being much more active than that obtained by incineration at the higher temperatures. Thus, in addition to obtaining a similar amount of soda ash for return to the pulp process, there is obtained a larger proportion of carbon of much greater activity. The sodium salts may be leached away from this carbon in the usual manner and the carbon filtered and dried for use in thermo-chemical reactions in general, and for use as a catalyst in the promotion of gas reactions and so forth. The use of this carbon for thermo-chemical reaction in general, and more specifically for the production of alkali-metal cyanide is fully described and claimed in my application Serial No. 426,863, and filed at the same time as the present application.

The principal object of the present invention is to provide a new substance that is adapted to be used in chemical reactions either as one of the main reaction materials or as a catalyst. Another object of my invention is to improve upon, or to render more efficient, processes in which the chemical reactions between the main reaction materials are practically dependent upon the presence of an extended reaction surface such as furnished by certain forms of carbon.

The new carbon, obtained from the source described, has numerous economical advantages over other forms of carbon. It is produced in a finely divided condition and ordinarily requires no grinding previous to mixing with charges for thermo-chemical operations. Its great chemical activity causes higher yields and permits shorter reacting time in thermo-chemical operations than when other forms of carbon are used, thus increasing plant output of finished product. On account of its low cost, it is applicable to practically all thermo-chemical operations in which carbon is used, and its chemical activity and purity make it especially adaptable to operations in which freedom from impurities in the finished product is of importance, such as for instance, in the manufacture of ultramarine, carbon bisulphide, and tetrachloride, and many similar operations where purity and activity of carbon are desirable.

The reactivity of this form of carbon is indicated by the low temperature at which it ignites with oxygen or air. In my previous application referred to above, I stated that when carbon obtained from the black liquor by the usual method of incineration at high temperatures, was heated in a current of air, many samples of the carbon ignited below 150° C., and in some cases between 80–120° C. In a few instances an ignition temperature below 80° C. had been observed. With this newer form of carbon from the same source, but obtained by the decomposition at lower temperatures of the alkali-soluble compounds existing in the wood, the ignition temperature is even lower than the temperatures stated above, and the majority of samples, if properly prepared, will ignite at temperatures below 90° C., and in many cases below 80° C. The ordinary reactive forms of carbon heretofore known require much higher temperatures for ignition. Collins, in "Transactions of the American Electro-Chemical Society," Volume I, 1902, page 53, states that "amorphous carbon is consumed when heated in oxygen at 370–385° C." Moissan in "The Electric Furnace," page 37, says that "purified lamp black ignites in oxygen at temperatures from 370° C. to as high as 506° C. depending upon the purification treatment, calcination temperature, etc."

In the process for obtaining this improved form of carbon of increased activity by decomposing the organic compounds soluble in alkali solutions which exist in the wood and usually constitute about half the weight of the original wood, care should be taken to avoid exposing the evaporated soda ash-carbon residue to the air on account of its low ignition point. In order to guard against loss of carbon through ignition by virtue of its low combining point with oxygen, and in order to obtain a highly reactive form of carbon, the black liquor is preferably run into covered, shallow pans provided with agitators and set in brickwork furnaces, the pans being heated by gas, oil, or other suitable means. The first stage of the operation consists in boiling off the water existing in the black liquor, which usually amounts to about 50% of its total weight. When the water has been eliminated the mass begins to thicken, and finally reaches a stage of almost rubbery consistency. During this stage energetic agitation must be used to allow the escape of the gases produced by the decomposition of the organic compounds present in the material. If this is properly carried out, the material soon passes from the rubbery stage and flattens down to a smooth melt, somewhat similar to melted asphaltum, and from this stage of the operation, the material may be carried rapidly down to dryness at a temperature between 200 and 500° C. without danger of injuring the mass in the absence of air. The material is then allowed to cool before removal from the pans. In this condition, the material contains sodium oxygen compounds equivalent to 60–65% sodium oxygen carbonate, and finely-divided and uniformly active carbon amounting to 40–35% of the weight of the mass. The resulting material may for some purposes be used directly without further treatment or it may be leached with water to dissolve out the sodium compounds, thoroughly washed, and dried at low temperatures for use either as a catalyst or for thermo-chemical reactions in general which involve the use of carbon as one of the reactive elements.

The chemical activity of the carbon is not affected by washing. Although the pure carbon ignites in air at a lower temperature than does the mixture of carbon with sodium compounds, this is due to the smothering effect of the sodium compounds, and not to a lower chemical activity of the carbon itself.

The application of the new form of carbon to processes involving catalysts may be illustrated by the following examples:

(1) The manufacture of phosgene ($COCl_2$):

A mixture of equimolecular proportions of carbon monoxide and chlorine is passed in contact with the dry carbon which is preferably maintained at a temperature of from 70 to 100° C. The reaction proceeds in accordance with the following equation:

$$CO + Cl_2 = COCl_2$$

Care must be taken that the gas after leaving the catalyst does not come in contact with water, since phosgene is readily decomposed thereby into carbon dioxide and hydrogen chloride.

Other examples of reactions brought about by passing a gas or gas mixture in contact with this carbon, are the production of a hydrogen halide from a mixture of hydrogen and a halogen such as chlorine; the production of sulphuryl chloride from sulphur dioxide and chlorine according to the following equation:

$$SO_2 + Cl_2 = SO_2Cl_2;$$

the oxidation of phosphine to phosphorus pentoxide in accordance with the equation $$2PH_3 + 4O_2 = P_2O_5 + 3H_2O;$$

and the oxidation of the lower nitrogen oxides to a higher degree of oxidation. In general, the temperatures for these reactions need not be above 250° C.

The above examples illustrate the application of the new carbon catalyst to processes involving a reaction between a chemically active, normally gaseous metalloid, for example oxygen, chlorine, etc., on the one hand, and on the other hand, a normally gaseous substance composed of oxygen combined with a metalloid other than oxygen, such as carbon, nitrogen, or sulphur. In more general terms, my new process comprises simultaneously subjecting to the catalytic action of the carbon catalyst a chemically active metalloid and a substance, preferably in the gaseous state, whose molecule contains at least two different elements, at least one of which is a metalloid. It will be understood, however, that my invention, as regards the process, is not limited to a reaction involving the class of substances defined in the preceding sentence, but includes reactions between such simple fluid substances as hydrogen and chlorine, the catalyst in every case being the carbon hereinbefore described.

This form of carbon, on account of its extremely extended surface is also an efficient decolorizing agent, as for example, for decolorizing contaminated sugar solutions, the darker forms of lactic acid, and the like.

I claim:—

1. A chemical reagent comprising carbon obtainable by thermally decomposing the alkali-soluble constituents of wood at a temperature below 500° C., said carbon being more reactive chemically than carbon produced at a higher temperature.

2. A chemical reagent comprising carbon obtainable by thermally decomposing the alkali-soluble constituents of natural cellulose fibers at a temperature below 500° C., said carbon being more reactive chemically than carbon produced at a higher temperature.

3. A chemical reagent comprising carbon obtainable by thermally decomposing the alkali-soluble constituents of wood at a temperature below 500° C., and having disseminated therethrough an alkali-metal compound.

4. A chemical reagent comprising carbon obtainable by thermally decomposing the alkali-soluble constituents of wood at a temperature below 500° C., and having an oxygen compound of sodium disseminated therethrough.

5. A chemical reagent comprising an intimate mixture of a sodium compound and carbon obtainable by removing the water from soda pulp black liquor and carbonizing the cellulosic constituents thereof at a temperature between 200 and 500° C.

6. A product comprising carbon capable of becoming ignited at a temperature below 80° C. in a current of air, said product being adapted for use as a chemical reagent or as a catalyst for accelerating gas reactions.

7. A product comprising alkali-soluble cellulose carbon capable of becoming ignited at a temperature below 80° C. in a current of air, said product being adapted for use as a chemical reagent or as a catalyst for accelerating gas reactions.

8. A chemical reagent comprising alkali-soluble cellulose carbon capable of becoming ignited at a temperature below 80° C. in a current of air, and having a compound containing sodium and oxygen disseminated therethrough.

9. A catalyst for accelerating gas reactions comprising carbon obtainable by thermally decomposing alkali-soluble cellulose at a temperature between 200 and 500° C.

10. A catalyst for accelerating gas reactions comprising carbon obtainable by thermally decomposing alkali-soluble cellulose at a temperature below 550° C. and containing less than 2% of sodium oxide and carbonate.

11. A catalyst for accelerating gas reactions comprising carbon obtainable by removing water from soda pulp black liquor, carbonizing the residue with exclusion of air at a temperature between 200 and 500° C. and removing at least part of the sodium compounds therefrom.

12. The process which comprises heating alkali-soluble cellulose at a temperature between 200 and 500° C. while excluding air therefrom until said cellulose has become carbonized.

13. The process which comprises heating alkali-soluble cellulose at a temperature between 200 and 350° C. while excluding air therefrom until said cellulose has become carbonized.

14. The process which comprises removing water from soda pulp black liquor and carbonizing the residue at a temperature between 200 and 500° C. while excluding air therefrom.

15. The process which comprises removing water from soda pulp black liquor and carbonizing the residue at a temperature between 200 and 350° C. while excluding air therefrom.

16. The process which comprises removing water from soda pulp black liquor, carbonizing the residue at a temperature between 200 and 500° C., and separating from the resulting carbon at least a major portion of the sodium compounds associated therewith.

In testimony whereof I affix my signature.

CHARLES B. JACOBS.